(12) United States Patent
Vandevelde et al.

(10) Patent No.: US 6,428,734 B1
(45) Date of Patent: *Aug. 6, 2002

(54) PROCESS FOR MANUFACTURING INJECTION MOULDED OBJECTS USING SIDE WALLS AND PLURAL INJECTION POINTS

(75) Inventors: Michel Vandevelde, Ypres; Bernard Forment, Kortrijk, both of (BE)

(73) Assignee: Innova Packaging Systems N.V., Ypres (BE)

( * ) Notice: Subject to any disclaimer, the term of this patent is extended or adjusted under 35 U.S.C. 154(b) by 0 days.

This patent is subject to a terminal disclaimer.

(21) Appl. No.: 09/505,433

(22) Filed: Feb. 16, 2000

Related U.S. Application Data

(63) Continuation-in-part of application No. 08/782,257, filed on Jan. 14, 1997, now Pat. No. 6,103,175.

(30) Foreign Application Priority Data

Sep. 10, 1996 (EP) .............................................. 96202516

(51) Int. Cl.⁷ .......................... B29C 45/27; B29C 45/44
(52) U.S. Cl. ............................. 264/328.8; 264/328.12; 264/334; 425/573; 425/DIG. 58
(58) Field of Search .............................. 264/328.8, 334, 264/328.12; 425/573, DIG. 58

(56) References Cited

U.S. PATENT DOCUMENTS

| | | | | |
|---|---|---|---|---|
| 3,626,051 A | * | 12/1971 | Liautaud ................. | 264/328.8 |
| 3,917,789 A | * | 11/1975 | Heisler .................... | 264/328.8 |
| 3,975,494 A | * | 8/1976 | Tritenne .................. | 264/328.8 |
| 3,978,186 A | * | 8/1976 | Lovejoy .................... | 264/334 |
| 4,481,161 A | * | 11/1984 | Grannen, III ............ | 264/328.8 |
| 4,881,891 A | * | 11/1989 | Luther ................. | 425/DIG. 58 |
| 5,145,630 A | * | 9/1992 | Schad ..................... | 264/328.8 |

* cited by examiner

*Primary Examiner*—Jill L. Heitbrink
(74) *Attorney, Agent, or Firm*—James Creighton Wray; Meera P. Narasimhan

(57) ABSTRACT

The invention relates to a process for manufacturing injection moulded objects of thermoplastic material by injecting molten thermoplastic material into a mould from at least two distinct injection points whereas the flows of molten material from each injection point each fill part of the mould and flow together to fill the entire mould while still in molten state, wherein objects having a size of more than 80 cm along each of its three dimensional axes are produced by providing at least two distinct injection points at opposite sides of the mould. The invention also relates to injection moulding equipment for the manufacture of moulded objects of thermoplastic material, comprising at least two distinct injection points provided at opposite sides of a single mould assembly. The invention further also relates to three dimensional moulded objects of thermoplastic material having a size of more than 80 cm along each of its three dimensional axes. The mould assembly has side walls that move sideways when opening the mould to facilitate demoulding of the moulded object.

10 Claims, 6 Drawing Sheets

PROCESS FOR MANUFACTURING INJECTION MOULDED OBJECTS USING SIDE WALLS AND PLURAL INJECTION POINTS

This application is a continuation-in-part of application Ser. No. 08/782,257 filed Jan. 14, 1997, now U.S. Pat. No. 6,103,175.

BACKGROUND OF THE INVENTION

The present invention relates to an injection moulding process, more particularly to a process for manufacturing injection moulded objects of thermoplastic material, to a device for carrying out such processes, and to a new type of moulded objects obtainable with such process.

Injection moulding of thermoplastic materials to produce objects of all sorts of shapes and sizes, is well known in the art.

It is also known however that there are certain limitations to the size of the objects to be moulded (in function also of the complexity of the moulded shapes) as a consequence of the rheologic properties of the molten thermoplastic in the moulds.

As the flow of molten plastic progresses into the mould cavity the material will cool down, which together with the Theological resistances in the mould will cause the pressure to build up at the point of injection; these pressures will of course be related to the length of the flowlines in the mould and therefore to the size of the object to be moulded.

To overcome these problems several solutions have been proposed in the art, such as:

- high pressure equipment to overcome the pressure build-up, but this approach is quite expensive due to the material costs involved;
- use of heated moulds to avoid the cooling down of the molten plastic in the mould, but this approach is also complex and costly due to the structural complexity of the different parts of such a heated mould; and
- use of a plurality of injection points into the mould cavity to increase the speed of injection and the volume of the molten material flowing into the mould so as to reach the other side of the mould and fill the mould before the pressure builds up too much, but this approach has only shown satisfactory where the size of the object to be moulded in the directions) away from the injection points (the "second dimension" or base area, and the "third dimension" or height of the three dimensional object) is still relatively limited, i.e., at most about 50–60 cm, and at the absolute most about 80 cm when also using high pressure technology and/or heated mould technology and/or very special thermoplastics.

The object of the present invention is to provide a method for manufacturing injection moulded objects of thermoplastic material which overcomes the drawbacks of the known art and which in particular allows the injection moulding of objects having a size of more than 80 cm in a direction away from the injection point(s), or objects having a size of more than 60 cm in a direction away from the injection point(s) without using high pressure technology. It is also the object of this invention to provide a possibility for objects having a size of more than 80 cm along each of its three dimensional axes. Furthermore, the present invention provides for even flowing of the molten material from all three axes, rather than singular or two-dimensional flow methods that are currently in use. The present invention allows for uniformity along the flow lines and formation of elongate large sized three dimensional structures that is not problematic with existing methods.

SUMMARY OF THE INVENTION

The invention therefor provides a process for manufacturing injection moulded objects of thermoplastic material by injecting molten thermoplastic material into a mould from at least two distinct injection points whereas the flows of molten material from each injection point fill part of the mould and flow together to fill the entire mould while still in molten state, wherein at least two distinct injection points are provided at opposite sides of the mould.

The expressions "opposite sides" of the mould or "opposite sides" of the moulded object, as used herein, should be understood as designating positions on the mould or on the moulded object from which two flows of molten plastic flowing in essentially opposite directions are able to fill the volume of said mould or object.

Whereas according to the state of the art of injection moulding of thermoplastics multiple injection points into one single mould are known, these multiple injection points have been located on essentially one side of the mould whereas the distance between these injection points has been kept relatively close to achieve as quickly as possible the merger of the individual progressing flows of molten material and form one relatively uniform flow of molten material progressing in essentially one direction.

It has now been found surprisingly that by using more than one flow of molten material flowing in essentially opposite directions, in accordance with this invention, whereby the merging of the progressing flows is postponed until the actual filling of the mould at the points of merger of these flows, moulded objects of excellent quality could be obtained, contrary to the generally admitted prejudice that the individual flows should merge together as soon as possible to avoid quality loss at the merging line of the individual flows of molten material.

The injection of the molten material at the separate injection points located at opposite sides of the mould is preferably carried out substantially simultaneously, but under specific circumstances depending on the shape and structure of the mould and the internal flowlines in the mould it may be preferable to start with the injection at one of the opposite injection points and only subsequently start injection at the other injection point(s), in a pre-established timing sequence that may readily be determined experimentally by the skilled art worker in function of the particularities of the object to be moulded.

Thus also, the actual position of the opposite injection points to the mould are essentially determined by the length of the overall flowlines of the molten material in the mould structure whereby the injection points are preferably positioned in such way that the length of the flowlines or the flowtime of the molten material from the opposite injection points on the mould to the point of merger of the molten material from the opposite injection points is essentially evenly distributed.

Molten material is injected into a mould from plural positions on the mould, allowing for plural flows of molten material through the mould. The flows flow in opposite directions from three dimensional axes of the mould from injection points in one plane along two dimensional axes of the mould, and from at least one further injection point along a third dimensional axis perpendicular to the one plane, thus creating three dimensional injection of molten material into the mould. This allows for even flowing of the molten material from all axes.

This also will be easily established by the skilled art worker in function of the particularities of the objects to be moulded.

The number of injection points in accordance with the invention is at least two, but this number may be more as required by the particularities of the objects to be moulded.

Thus there may be used three or more injection points from different angles and extremities of the mould to provide more than two flows of molten plastic material flowing in essentially opposite directions.

In this context it should be observed that for instance four injection points essentially located according to the four summits of a tetraeder are considered to provide flows of molten material globally flowing in essentially opposite directions before merging together at a more or less central point of the mould.

The injection points at opposite sides of the mould may furthermore also each consist of a plurality of injection points on each respective opposite side of the mould.

According to another embodiment of the invention "low pressure" technology is preferably used to produce objects having a size of more than 60 cm along each of its three dimensional axes.

The expression "low pressure" technology as used herein refers to the use of injection pumps allowing a maximum cavity pressure of 100 bar, as opposed to "high pressure", technology which uses injection pumps with maximum cavity pressures well above 250 bar.

It has also been found surprisingly that with the present invention it is easy to avoid any problems of air entrapment between flows of molten material merging from opposite directions, contrary to what would have been expected in view of the state of the art prejudices.

According to a specific feature of the invention this is achieved by allowing the air displaced in the mould by the flows of molten thermoplastic material to escape through slits which allow through the air but not the molten thermoplastic material.

In practice it has been found that the slits and interstices anyway existing in standard good quality multi-piece moulds provide the necessary properties for this preferred feature of the invention.

According to still another feature of the invention, the thermoplastics used are preferably polyolefins such as in particular polyethylenes (low density polyethylenes, high density polyethylenes, linear low density polyethylenes, etc.) and polypropylene; the process is however also suitable for any other type of thermoplastic resins.

The invention also relates to devices for carrying out the injection moulding process according to the invention.

In particular the invention thus relates to an injection moulding equipment for the manufacture of moulded objects of thermoplastic material, comprising at least two distinct injection points provided at opposite sides of a single mould assembly.

According to a preferred feature of the invention, the equipment is specifically designed for the injection moulding of polyolefin objects having a size of more than 80 cm along each of its three dimensional axes.

In a preferred embodiment of the injection moulding equipment according to the invention the equipment is of the low pressure technology type. In this embodiment the equipment is preferably designed for the injection moulding of polyolefin objects having a size of more than 60 cm along each of its three dimensional axes.

According to another preferred feature of the invention, the mould assembly of the injection moulding device comprises slits of a size allowing through air but not the molten thermoplastic material.

As already stated above standard good quality multi-piece moulds generally provide the necessary properties for this preferred feature of the invention.

The invention finally also relates to three dimensional moulded objects of thermoplastic material with features unachievable and therefore unknown before in the art, i.e. having a size of more than 80 cm along each of its three dimensional axes.

More in particular the invention relates to moulded thermoplastic cases with a bottom and a peripheral wall or peripheral walls, with length and width axes or diameter of the bottom and a height of the walls of at least 80 cm, preferably of at least 100 cm.

According to a preferred feature of the invention these three dimensional moulded objects are made of a thermoplastic polyolefin, preferably polyethylene, polypropylene or mixtures thereof.

The invention will be further explained herebelow with reference to the attached drawings representing specific embodiments of the invention. It should be observed that the specific features of these embodiments are only described as preferred examples of what is intended within the above general disclosure of the invention and should by no means be interpreted as limiting the scope of the invention as such and as set forth in the claims.

DETAILED DESCRIPTION OF THE PREFERRED EMBODIMENTS

Figure 1:
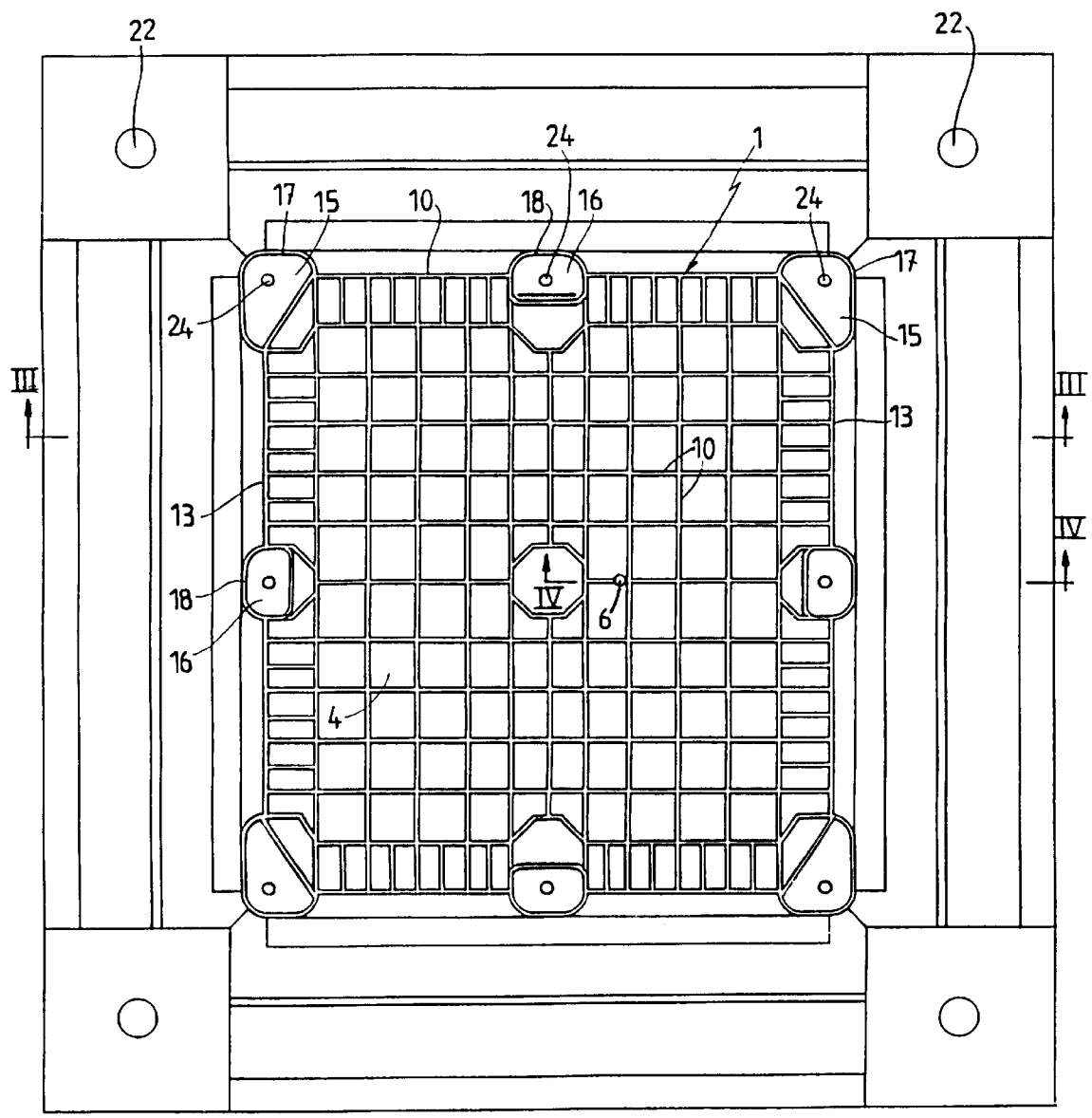
FIG. 1 is a top view of part of a moulding device—in accordance with the invention—for carrying out the process in accordance with the invention, showing the female mould part.

In FIG. 1 the female mould part of the moulding device is designated as a whole with reference numeral (1)

Figure 2:
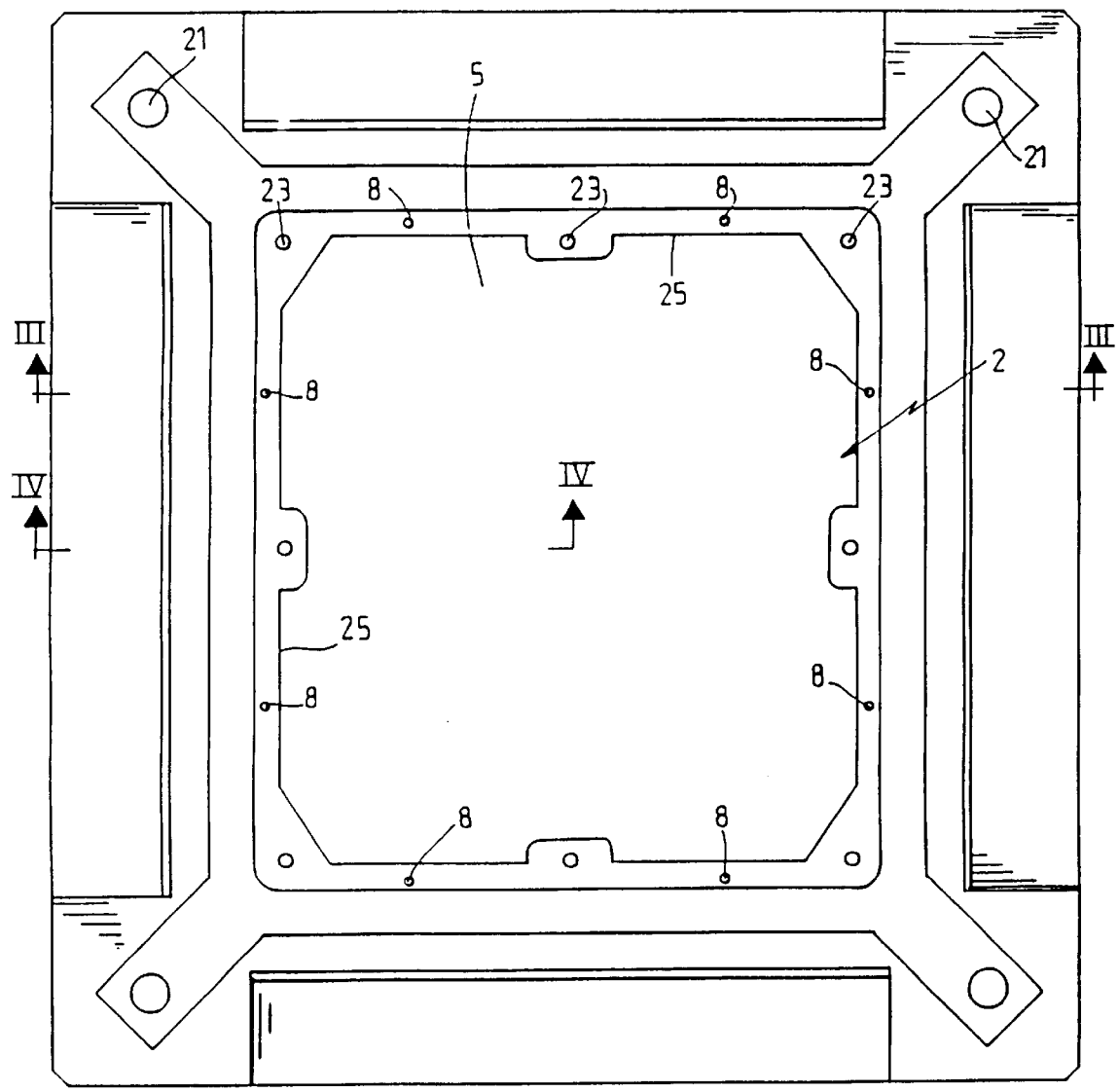
FIG. 2 is a bottom view of the male mould part fitting in the female mould part of the moulding device of FIG. 1.

In FIG. 2 the male mould part of the moulding device is designated as a whole with reference numeral (2).

Figure 5:
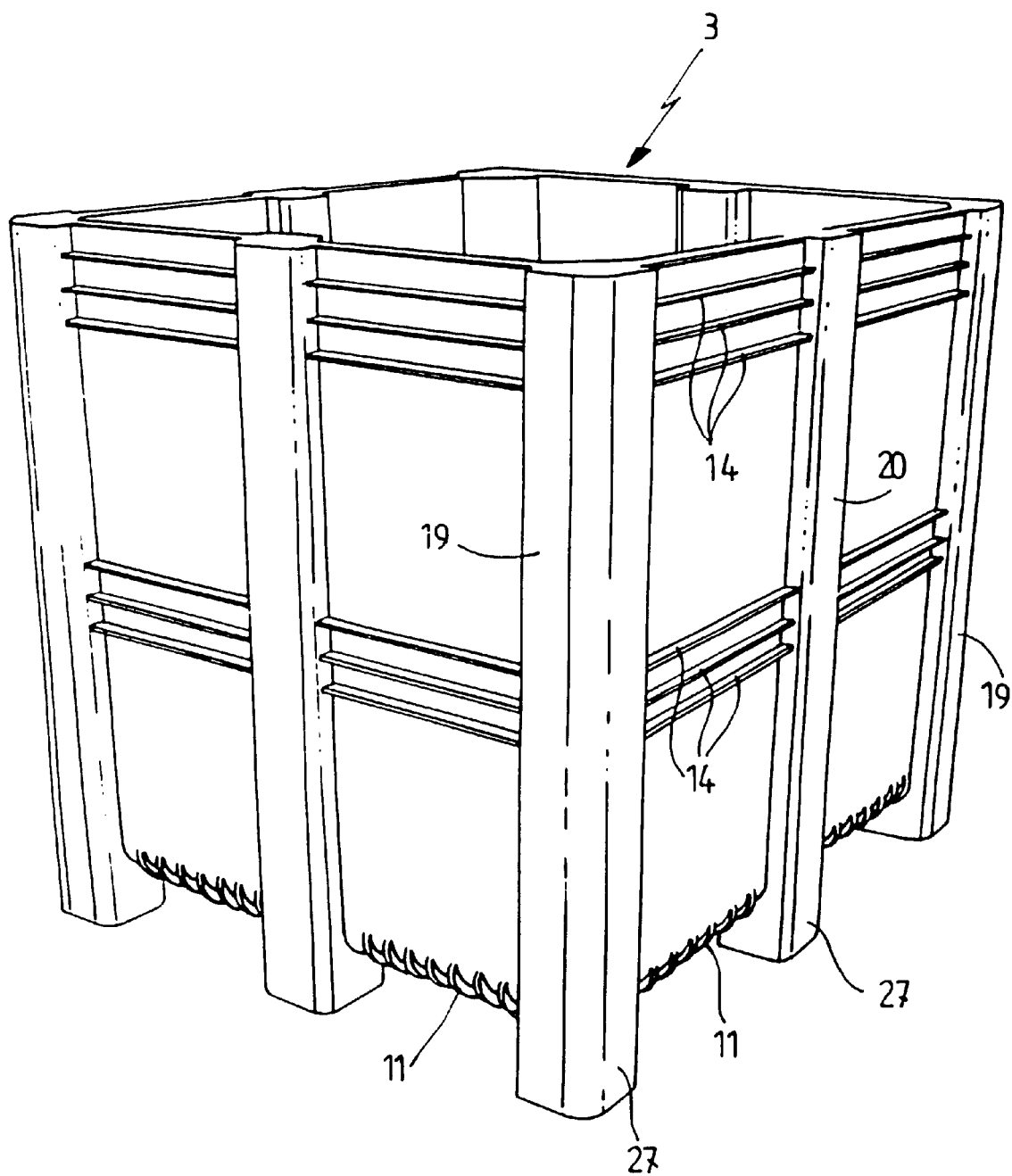
FIG. 5 is a perspective view of a three dimensional moulded object in accordance with the invention.

The male (2) and female (1) parts of the mould define together the shape of a three dimensional volume corresponding to a three dimensional object to be moulded in said mould. In the present example this three dimensional object corresponds to a moulded plastic case as represented in FIG. 5 and designated there as a whole with reference numeral (3).

The bottom of the three dimensional object is defined by the volume between the surfaces (4) of the female mould part (1) and the surface (5) of the male mould part (2). The injection point on one side of the mould (in this example on the female part side of the mould) is designated by reference numeral (6), near the center of surface (4), whereas the molten material accesses into the mould through a nozzle (7) as represented schematically on FIG. 4.

Figure 3:
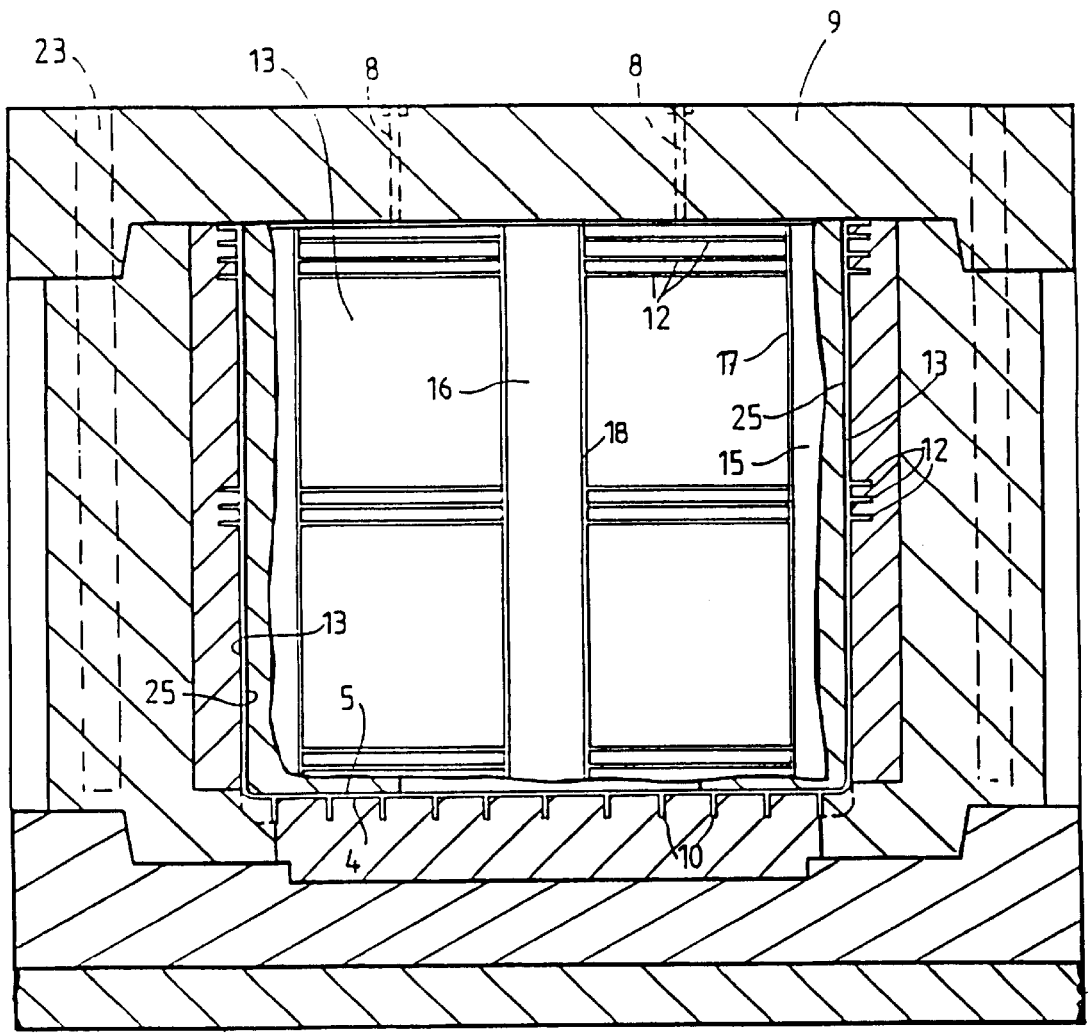
FIG. 3 is a sectional view of the moulding device according to the invention, according to plane III—III of FIGS. 1 and 2.

The injection point on the opposite side of the mould consists of a plurality (eight in total) of injection nozzles (8) through the closing cover part (9) of the male mould part (1), as schematically shown more particularly on FIG. 3.

Whereas the surface of the male mould part (2) defining the inner surface of the moulded plastic case (3) is smooth, the surface of the female mould part (1) defining the outer surface 10 of of the moulded plastic case (3), is provided with linear grooves (10) on surface (4), defining longitudinal and transversal ribs (11) on the bottom of the moulded plastic case (3), and with linear grooves (12) on its lateral surfaces (13), defining horizontal reinforcing ribs (14) on the outer surface of the moulded plastic case (3).

The female mould (1) further comprises insert parts (15) and (16) respectively defining mould cavities (17) and (18) corresponding to respective corner-reinforcing beams (19) and wall-reinforcing beams (20) of the moulded plastic case (3).

The mould device is furthermore equipped with cooperating guiding means (respectively, cylindrical beams (21) and cavities (22), and rods (23) and bores (24)) for the perfect alignment of the various mould parts during operation.

In addition to the linear grooves (10) on the bottom surface (4) of the mould, defining the longitudinal and transversal ribs (11) on the bottom of the moulded plastic case (3), the female mould also comprises in the area of the insert parts (15) and (16), defining the respective corner-reinforcing beams (19) and wall-reinforcing beams (20) of the moulded plastic case (3), deeper grooves or cavities (26) which define the supporting "legs" (27) of the moulded plastic case (3).

Figure 4:
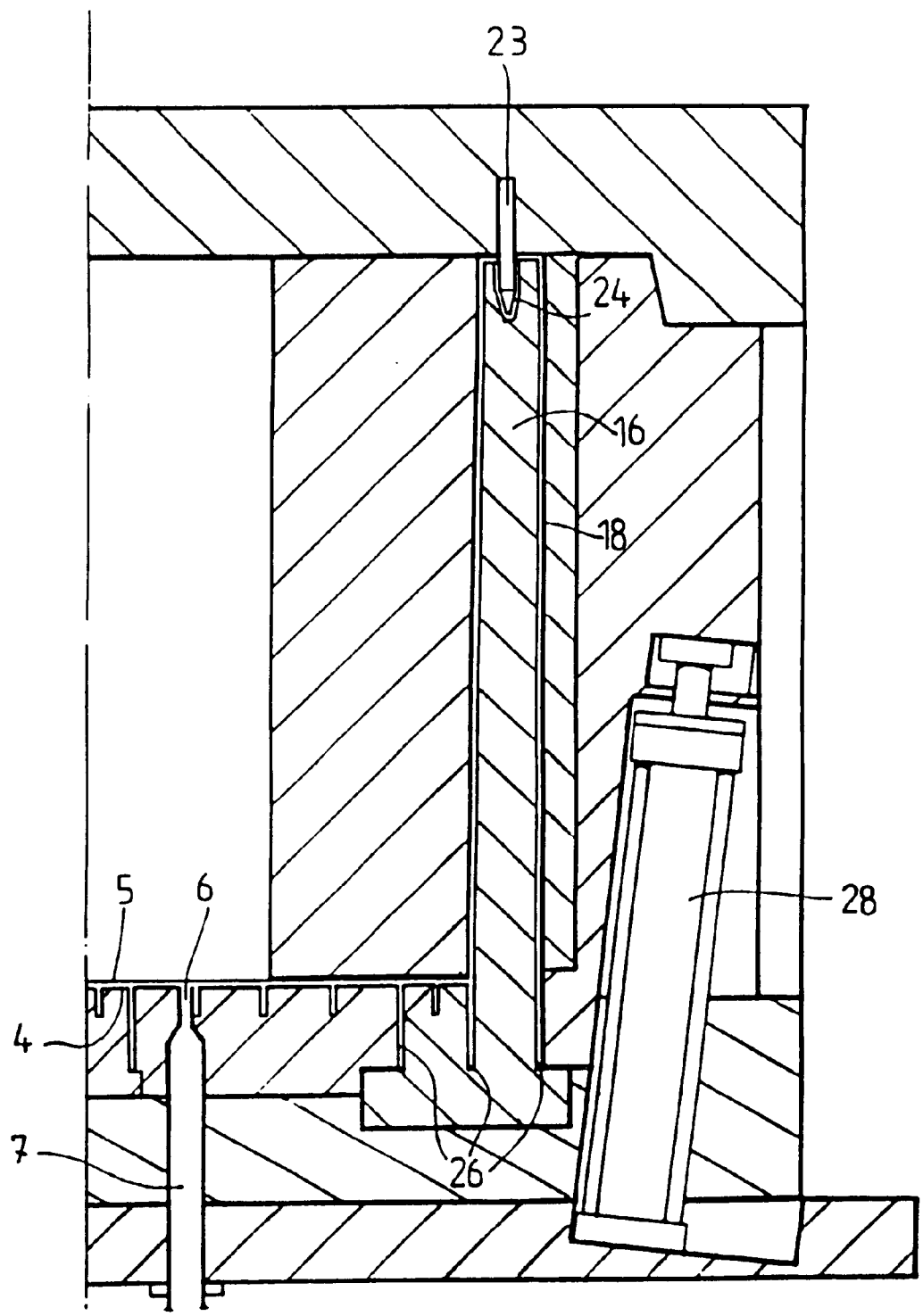
FIG. 4 is a sectional view of the moulding device according to the invention, according to plane IV—IV of FIGS. 1 and 2.

The female and male mould are made up of separate metal pieces adequately assembled and fitted together in such way that upon opening the mould some parts may move outwardly to free the moulded object. These separate metal pieces of the mould parts are represented very schematically on the sectional views of FIGS. 3 and 4. FIG. 4 also schematically shows a pneumatic jack (28) used for opening the mould and moving outwardly some of the mould parts.

Figure 6:
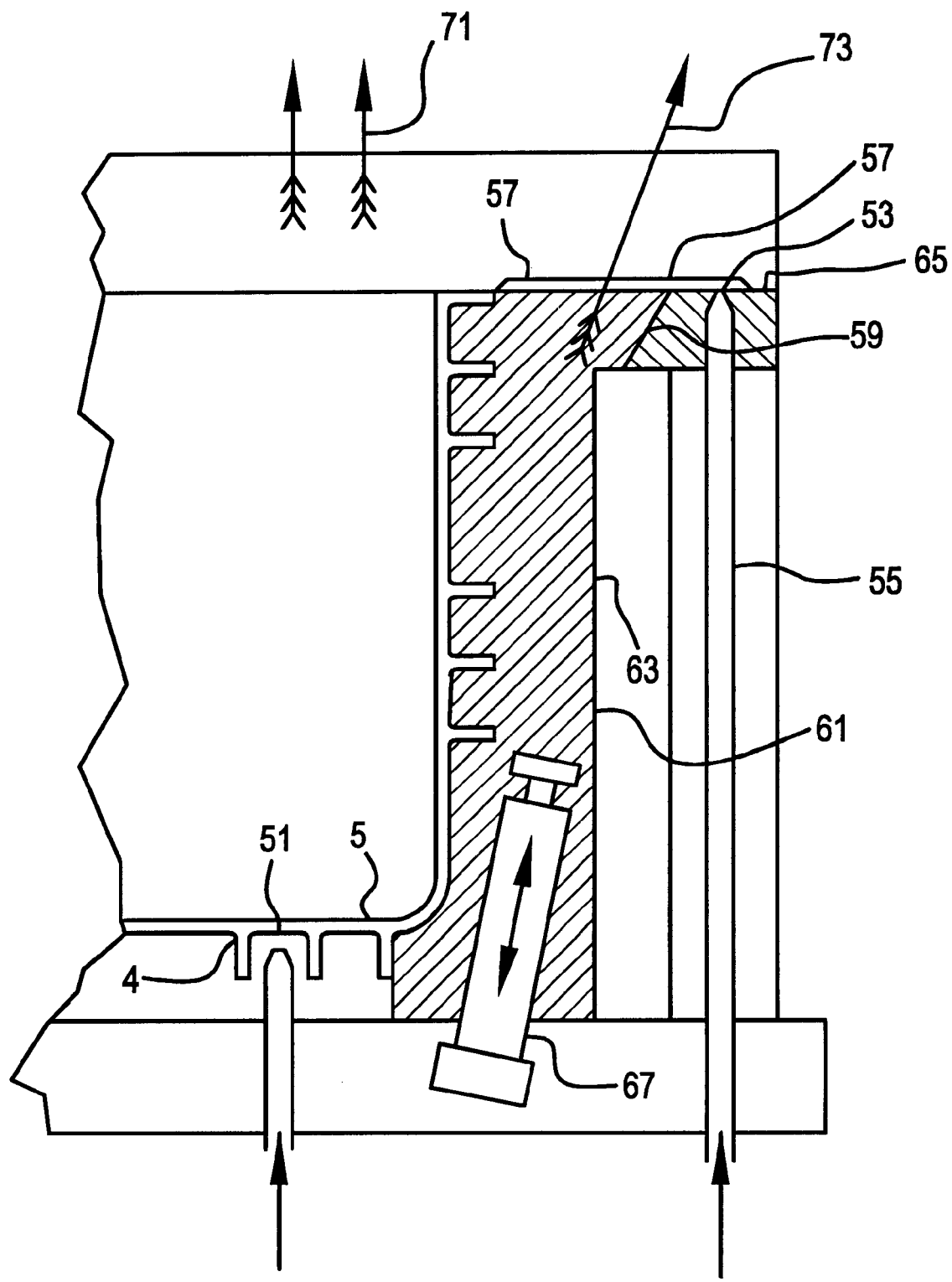
FIG. 6 is an alternate embodiment of the sectional view of FIG. 4.

FIG. 6 shows another embodiment used to facilitate the demoulding of a moulded object. Molten polyolefin is injected through injection points (51) and (53). Injection point (53) has a long injection nozzle (55) that remains fixed. Gate (57) allows flow of the injected molten polyolefin from the injection point (53) through the gate to the cavity between surfaces (4) and (5) of the female and male moulds. Parting line (59) between slide (61) and side wall (63) allows for fixing of injection point (53). Parting line (65) allows for separation of the mould (removed in a direction indicated by arrow (71)) from the slide (61) (removed in a direction indicated by arrow (73)) and side wall (63). Pneumatic jack (67) may be used to facilitate opening the mould and moving outwardly some of the mould parts. This embodiment uses moulds with side walls that move sideways when opening the mould to facilitate demoulding of the moulded objects.

On the schematic views of the invention, represented on the enclosed drawings, the various piping necessary for leading the molten polyolefin to the injection nozzles has not been represented. The required piping has to be rigid in view of the considerable pressures involved, even in so called "low pressure", equipment. The connections of this rigid piping to the nozzles on the mould are preferably of a quick assembly type (known per se) to allow the quick and efficient opening of the mould upon each injection cycle.

In carrying out the process of the invention with the equipment described hereabove one stream of molten polyolefin is injected into the mould through injection nozzle (7) at injection point (6), and another stream is injected evenly through the plurality of injection points.

The flow of molten polyolefin from injection point (6) flows between surfaces (4) and (5) of the female and male mould, thus filling the cavity corresponding to the bottom of the three dimensional moulded object (3), and subsequently flows between walls (13) and (25) of the female and male mould.

More or less simultaneously the flows of molten polyolefin from injection points (8) flow between walls (13) and (25), merging with each other while progressing.

The flows of molten polyolefin from injection point (6) and from injection points (8) merge at the level of a plane corresponding to approximately half of the height of the three dimensional object (3).

Other details of the embodiment of the invention given here by way of example will be apparent to the skilled art worker from the accompanying drawings. Such further details also constitute preferred specific features of the invention.

The specific example described hereabove in particular consists of a moulded plastic case which can very suitably be as a case for handling vegetable and fruit crops for wholesale purposes.

The particular case referred to has a preferred length of 130 cm, a preferred width of 115 cm and a preferred height of 125 external sizes).

Using the moulding process according to the invention such cases can very suitably be manufactured from polyolefins or polyolefin mixtures obtained from plastic recycling sources.

While the invention has been described with reference to specific embodiments, modifications and variations of the invention may be constructed without departing from the scope of the invention, which is defined in the following claims.

We claim:

1. A process for manufacturing an injection molded object of thermoplastic material comprising:

providing a cavity formed by a first mold and a second mold with side walls positioned between the first mold and second mold;

flowing molten thermoplastic material through a first injection point in the first mold and through a long injection nozzle extending from the first mold to the second mold outside of the side walls to a second injection point in the second mold;

injecting molten thermoplastic material into the cavity from the first and second injection points which provide plural injection positions on the first and second molds having plural separate flows of molten plastic flowing through the plural injection positions from three dimensions of the cavity for filling a volume of the cavity, wherein each flow of the molten thermoplastic material fills part of the cavity and the molten thermoplastic material from all of the injection positions flow together to fill the entire cavity while the material is entirely in a molten state, wherein the molded object has at least one dimension of more than 80 cm, opening the first and second molds with the side walls moving sideways to facilitate demolding of the molded object;

wherein the long injection nozzle remains fixed during the sideways movement of the side walls and the opening movement of the second mold.

2. The process of claim 1, further comprising flowing the material through two injection points in one plane along two dimensional axes of the mold, and at least one addition injection point along a third dimensional axis of the mold perpendicular on said plane.

3. The process of claim 1, further comprising flowing the material through two injection points in one plane of the mold, and at least one additional injection point along a third dimensional axis of the mold.

4. The process of claim 1, further comprising displacing air that is in the mold by the flow of molten thermoplastic material wherein the displaces air is allowed to escape through slits without affecting the molten thermoplastic material.

5. The process of claim 1, wherein the thermoplastic material is a polyolefin.

6. A process for manufacturing an injection molded object of thermoplastic material comprising:

providing a cavity formed by a first mold and a second mold with side walls positioned between the first mold and second mold;

flowing molten thermoplastic material through a first injection point in the first mold and through a long injection nozzle extending from the first mold to the second mold outside of the side walls to a second injection point in the second mold;

injecting molten thermoplastic material into the cavity from the first and second injection points which allow plural flows of molten plastic through the cavity, the flows flowing in from three dimensional axes of the mold from the injection points in one plane along two dimensional axes of the mold, and from at least on further injection point along a third dimensional axis of the mold, for filling a volume of the cavity, wherein the flows of molten material from each injection point each fill a part of the cavity by flowing together to fill the cavity entirely while the thermoplastic material is still in a molten state;

opening the first and second molds with the side walls moving sideways to facilitate demolding of the molded object;

wherein the long injection nozzle remains fixed during the sideways movement of the side walls and the opening movement of the second mold.

7. The process of claim 6, wherein the flowing the material through two injection points in one plane along two dimensional axes of the mold, and at least one addition injection point along the third dimensional axis of the mold comprises flowing through the third dimensional axis which is perpendicular on said plane.

8. The process of claim 6, further comprising flowing the material through two injection points in one plane of the mold, and at least one additional injection point along a third dimensional axis of the mold.

9. The process of claim 6, further comprising displacing air that is in the mold by the flow of molten thermoplastic material wherein the displaces air is allowed to escape through slits without affecting the molten thermoplastic material.

10. The process of claim 6, wherein the thermoplastic material is a polyolefin.

* * * * *